March 19, 1963 C. SCHNELL 3,081,484
GROUND MEAT DEAERATOR
Filed Jan. 12, 1960 2 Sheets-Sheet 1

March 19, 1963 C. SCHNELL 3,081,484
GROUND MEAT DEAERATOR
Filed Jan. 12, 1960 2 Sheets-Sheet 2

Inventor
Carl Schnell
By Merriam, Smith & Marshall
Attorneys 3,081,484
GROUND MEAT DEAERATOR
Carl Schnell, Winterbach, near Schorndorf, Wurttemberg, Germany, assignor of one-half to The Griffith Laboratories, Inc., Chicago, Ill., a corporation of Illinois
Filed Jan. 12, 1960, Ser. No. 1,991
Claims priority, application Germany Jan. 21, 1959
3 Claims. (Cl. 17—35)

This invention relates to deaerators for continuously removing air from meat and agricultural products fed thereto and processed therein, and food processing systems which include such a deaerator.

In the processing of meat and agricultural products, air commonly becomes mixed with or entrapped in these products during the treatment thereof. For example, in the preparing of meat products such as sausages, the meat may be initially cut in a preliminary cutter such as a Silent Cutter, then treated to form an emulsion in a high speed centrifugal comminuting machine such as shown and described in Schnell U.S. Letters Patent Nos. 2,840,318, Reissue 24,863, Reissue 24,764, and 2,906,310, and then treated in a sausage stuffer that stuffs the comestible comminuted meat emulsion into flexible food casings to form links thereof. During such treatment, air becomes admixed with the meat product and entrapped therein, despite the face that the above referred to high speed centrifugal comminuting machine may be operated so that the product being treated therein is sealed from the ingress of air during the operation of the machine. Air becomes admixed with the meat, for example, during the feeding of the meat into the hopper of the Schnell machine, as well as during processing steps prior thereto. Likewise, air becomes admixed with the meat product and entrapped therein when the meat is treated in cutting devices other than the Schnell type of machine referred to above and is subsequently stuffed into the flexible food casings.

When air is introduced or entrapped in meat (e.g., sausage) products, large air bubbles are formed therein. These bubbles substantially accelerate fermentation and induce disintegration of the meat product so that the storage life of the product is restricted to a limited time only. Moreover, air occupies unnecessary space and thus prevents the meat emulsion from fully filling the casings.

In order to obviate or reduce the introduction or entrapment of air in meat products, various vacuum devices have been proposed and considered. However, these devices are not suitable for continuous operation because the feeding opening thereto must be sealed repeatedly for renewed use of the machine, which often requires that the operation of the device be temporarily stopped. Further, such devices are generally ineffective, large, as well as expensive.

My invention relates to a deaerating device that may be operated continuously, in which air is removed from comminuted meat or agricultural products in an effective and economical manner.

My deaerator has a container with a feeding portion, vacuum portion and discharge portion. The feeding portion has an inlet that may be sealed during the passage of comminuted product therethrough and has a foraminous or perforate discharge outlet. This foraminous outlet communicates with the vacuum portion and provides an entrance thereto. The vacuum portion has a discharge outlet that communicates with the discharge portion and forms an entrance thereto. The foraminous outlet is positioned above and in substantially opposed relationship to the discharge outlet of the vacuum portion so that product passing through the foraminous outlet falls in elongated, relatively thin streams into the outlet of the vacuum portion and into the discharge portion. The discharge portion includes propelling means such as a screw conveyor for conveying the deaerated product from the vacuum portion to a discharge outlet of the discharge portion. This discharge outlet of the discharge portion may be sealed during the passage of discharged deaerated product therethrough. Vacuum means, such as a vacuum pump, is operatively associated with the vacuum portion and serves as an aspirator. The vacuum means maintains a vacuum in the vacuum portion of about 1 to 10 inches of mercury absolute and removes air from the falling product in the vacuum portion without destroying the comestible quality of the comminuted meat product being treated therein.

The foraminous outlet of the feeding portion may comprise a slotted or perforate circular plate. Or, said outlet may comprise a combination of such plates in interface contact with each other having communicating tubular openings, the size of which may be adjusted by rotating one or both of such plates. The foraminous outlet serves to divide the comminuted meat product into thin falling streams. When the meat is in this form, air may be more effectively removed from the meat product because of its enlarged exposure to the vacuum.

The streams of meat are gravity fed through the vacuum portion into the discharge portion. Once the comestible, deaerated, comminuted meat product is in the discharge portion, it is conveyed by a worm or screw conveyor to the discharge outlet of the deaerator. This conveyor and the deaerated product in the discharge portion serve to provide a seal at the exit end of the deaerator.

As pointed out above, the meat product may be treated in a Silent Cutter or preliminary cutter and then fed into the deaerator, or, it may be treated in a high speed centrifugal comminuting machine, such as the Schnell machine above, and then directly treated in the deaerator. After the comminuted product is treated in the deaerator, it may then be treated in a stuffing device which stuffs the comestible, deaerated, comminuted meat material into flexible casings to form links.

If desired, conventional sausage stuffers may be used, which comprise a cylinder having a plunger at the bottom thereof that is raised hydraulically to force meat out of a discharge tube at the top thereof into the casings; or, stuffers such as sanitary slurry pumps may be used.

In order to reduce or obviate the admixing or introducing of air with or into the meat product, a continuous sealed system may be used which comprises a comminuting device or a combination of such devices, the deaerator, and subsequent food treating devices such as sausage stuffers. Such systems provide for the continuous treatment of the meat product, while, at the same time, minimizing its contact with air and providing a product that has been effectively deaerated.

FIGURE 1 illustrates a meat (e.g., sausage) processing system comprising a high speed centrifugal comminuter, such as the Schnell machine referred to above, the deaerator, and a sausage stuffer.

Figure 1:
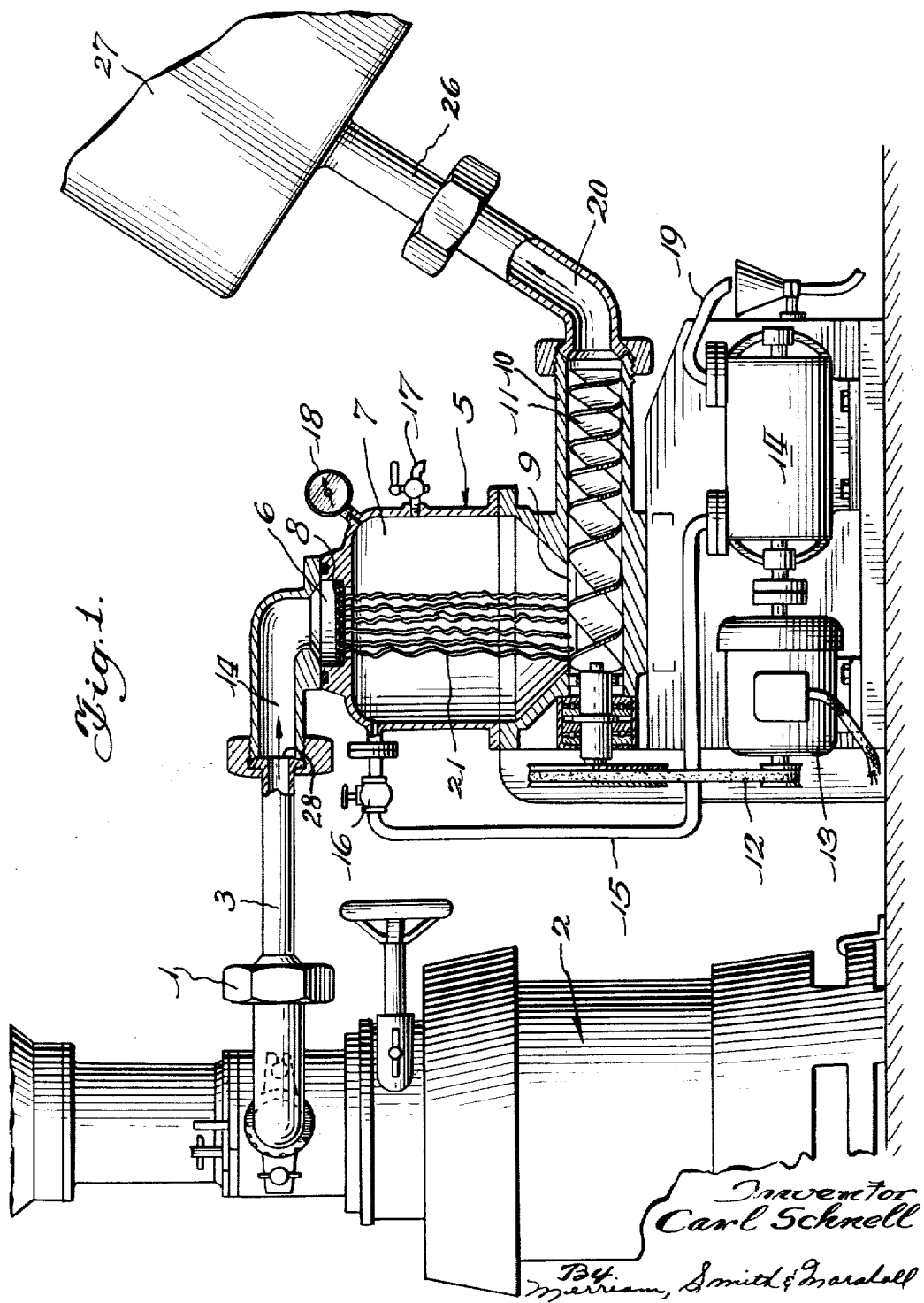
FIGURE 1 is a diagrammatic illustration, partially in section, of an embodiment of a food processing system constructed in accordance with the present invention.

The high speed centrifugal comminuting machine 2 shown in the drawing is the Schnell type of comminuter referred to above. The meat product is fed into the Schnell machine and is comminuted therein to form a meat emulsion without having air introduced into the material being comminuted therein. The meat emulsion is discharged from the comminuting machine 2 through its nozzle 1 into a connecting pipe 3, which in turn communicates with the inlet end of an L-shaped cylindrical deaerator feeding chamber 4 having an outlet 6. Feeding chamber 4 includes a restricted inlet 28. When the comminuting machine 2 is used in conjunction with the deaerator 5, the only entrance into the deaerator is through the feeding chamber.

The comminuted meat emulsion passes to foraminous discharge outlet 8 comprising two perforate or slotted circular plates that contact each other and which may be rotated so as to adjust the size of the orifices therein. The foraminous discharge outlet 8 from the feeding chamber communicates with the vacuum chamber 7 and provides an entrance thereto. The vacuum chamber has a discharge outlet 9 that communicates with an elongated cylindrical discharge chamber 10, which in turn has a discharge outlet communicating with the restricted cylindrical nozzle 20. The foraminous outlet 8 is positioned above and in substantially opposed relationship to the discharge outlet 9 so that product that passes through the foraminous outlet falls in thin elongated threads or streams 21 through the vacuum chamber 7 into the outlet 9 and into the discharge chamber 10. As shown in the drawing the distance of the path of fall of product in said vacuum portion is substantially more than twice the shortest distance across said plate through the center thereof. A rotary worm or screw conveyor 11 is positioned in the discharge chamber 10 and serves to positively propel the deaerated, comminuted meat emulsion from the deaerator through the up-turned nozzle 20.

A vacuum pump 14 has a pipe 15 extending therefrom to the upper portion of the vacuum chamber 7. This pipe includes a valve or spigot 16. A motor 13 drives the worm or screw conveyor 11 by means of a belt 12 and drives the vacuum pump 14. The vacuum pump 14 has an outlet pipe 19 for the discharge of water and air from the pump. The vacuum pump 14 maintains a vacuum of 1 to 10 inches of mercury absolute in the vacuum chamber 7. A vacuum gauge 18 is operatively mounted to the vacuum chamber 7. The vacuum chamber 7 also has an adjustable valve or spigot 17 which may be opened so that air may enter the vacuum chamber.

The nozzle 20 of the deaerator communicates with the pipe 26, which in turn communicates with a conventional sausage stuffer 27.

The above referred to meat treating system shown in the drawing is sealed against ingress of air so that air does not enter the system from the point where it is comminuted in the comminuting machine 2 to the point where it is introduced into the flexible links. Further, this system may be operated continuously, rather than as a batch operation.

Figure 2:
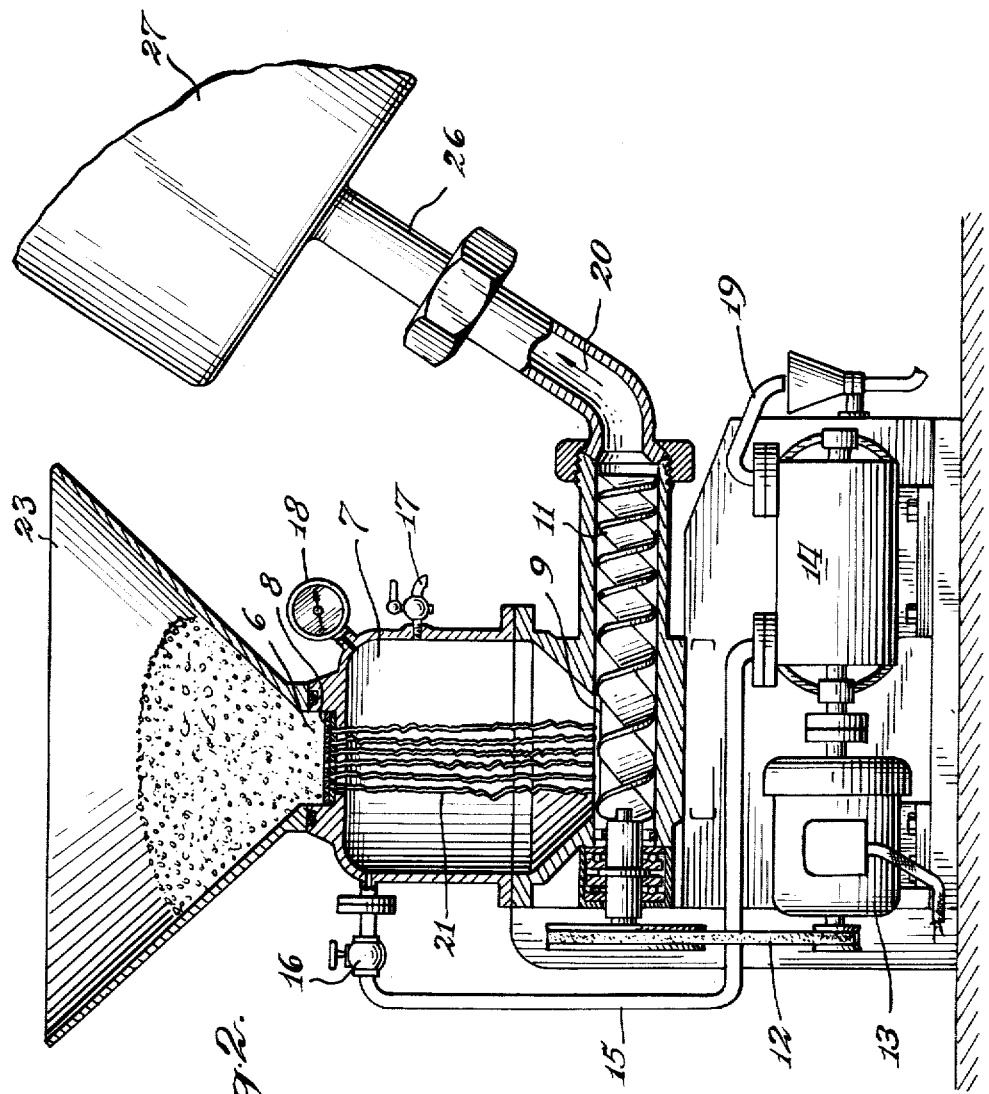
FIGURE 2 is a view similar to FIGURE 1 of another embodiment of a food processing system in accordance with the present invention.

Referring to FIGURE 2, in the event deaerator 5 is to be operated without directly communicating with a comminuting machine or meat or sausage stuffer, the funnel 23 replaces the upper portion of feeding chamber 4 and provides, in place thereof, at least a portion of the feeding chamber. Thus, meat fed into the funnel 23 passes through the restricted opening of the new feeding chamber into the restricted foraminous discharge outlet of said chamber. The up-turned nozzle 20 of the discharge chamber 10, along with the restricted portion of the feeding chamber, are sealed during the operation of the deaerator and thereby prevent the ingress of air into the material being deaerated in the vacuum chamber 7.

The foregoing detailed description has been given for clearness of understanding only, and no unnecessary limitations should be understood therefrom, as modifications will be obvious to those skilled in the art.

I claim:

1. A system for continuously treating comestible agricultural and meat products comprising a comminuting machine in airtight communication with a deaerator, said deaerator being sealed during operation and having a container with a feeding portion for receiving product from said comminuting machine, a vacuum portion and a discharge portion, said feeding portion having an inlet that is sealed during the passage of product therethrough, said feeding portion having a foraminous discharge outlet from said feeding portion, said foraminous outlet communicating with said vacuum portion and providing an entrance thereto, said vacuum portion having a discharge outlet communicating with said discharge portion and forming an entrance thereto, said foraminous outlet being positioned above and in opposed relationship to said discharge outlet of said vacuum portion so that product passing through said foraminous outlet falls in elongated streams into said outlet of the vacuum portion and into said discharge portion, said discharge portion including propelling means for conveying deaerated product from the vacuum portion to a discharge outlet for said discharge portion, said discharge outlet of the discharge portion being sealed during the passage of discharged product therethrough, vacuum means operatively associated with said vacuum portion including aspirator means, said vacuum means removing air from the falling product in said vacuum portion.

2. A system for continuously treating comestible meat products, said system being sealed during operation and comprising a comminuting machine in airtight communication with a deaerator, which in turn is in airtight communication with stuffing means for stuffing comestible, deaerated comminuted meat products into flexible casings, said deaerator having a container with a feeding portion for receiving products from said comminuting machine, a vacuum portion and a discharge portion, said feeding portion having a restricted inlet that is sealed during the passage of products therethrough, said feeding portion having a foraminous plate providing a discharge outlet from said feeding portion, said plate communicating with a relatively large vacuum portion and providing a restricted entrance thereto, said vacuum portion having a restricted discharge outlet communicating with a restricted elongated discharge portion and forming an entrance thereto, said foraminous plate being positioned above and in opposed relationship to said discharge outlet of said vacuum portion so that product passing through said foraminous plate falls in small elongated streams into said outlet of the vacuum portion and into said discharge portion, said discharge portion including propelling means for conveying deaerated product from the vacuum portion to a discharge outlet for said discharge portion, said restricted discharge outlet of the discharge portion communicating with stuffing means, and vacuum means operatively associated with said vacuum portion including aspirator means, said vacuum means removing air from the falling product in said vacuum portion.

3. A system for continuously treating comestible meat products; said system being sealed during operation and comprising a deaerator in airtight communication with stuffing means for stuffing comestible, deaerated comminuted meat products into flexible casings; said deaerator having a container with a feeding portion for receiving comminuted meat products, a vacuum portion, and a discharge portion; said feeding portion having a restricted inlet that is sealed during the passage of product therethrough; said feeding portion having a foraminous plate providing a discharge outlet from said feeding portion; said plate communicating with a relatively large vacuum portion and providing a restricted entrance thereto; said vacuum portion having a restricted discharge outlet communicating with a restricted elongated discharge portion and forming an entrance thereto; said foraminous plate being positioned above and in opposed relationship to said discharge outlet of said vacuum portion so that product passing through said foraminous plate falls in small elongated streams into said outlet of the vacuum portion and into said discharge portion; said discharge portion including propelling means for conveying de-aerated product from the vacuum portion to a discharge outlet for said discharge portion; said restricted discharge outlet of the discharge portion communicating with said stuffing means; and vacuum means operatively associated with said vacuum portion including aspirator means; said vacuum means removing air from the falling product in said vacuum portion.

References Cited in the file of this patent

UNITED STATES PATENTS

| | | |
|---|---|---|
| 1,528,887 | Offenhauser | Mar. 10, 1925 |
| 2,719,776 | Kummel | Oct. 4, 1955 |
| 2,837,762 | Azzini et al. | June 10, 1958 |

UNITED STATES PATENT OFFICE
CERTIFICATE OF CORRECTION

Patent No. 3,081,484                                                March 19, 1963

Carl Schnell

It is hereby certified that error appears in the above numbered patent requiring correction and that the said Letters Patent should read as corrected below.

Column 1, line 23, for "Reissue 24,863" read -- Reissue 24,683 --; line 28, for "face" read -- fact --.

Signed and sealed this 29th day of October 1963.

(SEAL)
Attest:

ERNEST W. SWIDER                                    EDWIN L. REYNOLDS

Attesting Officer                                   Acting Commissioner of Patents